A. WILLIAMS.
HOSE COUPLING.
APPLICATION FILED MAY 26, 1920.
1,432,583.
Patented Oct. 17, 1922.
2 SHEETS—SHEET 1.
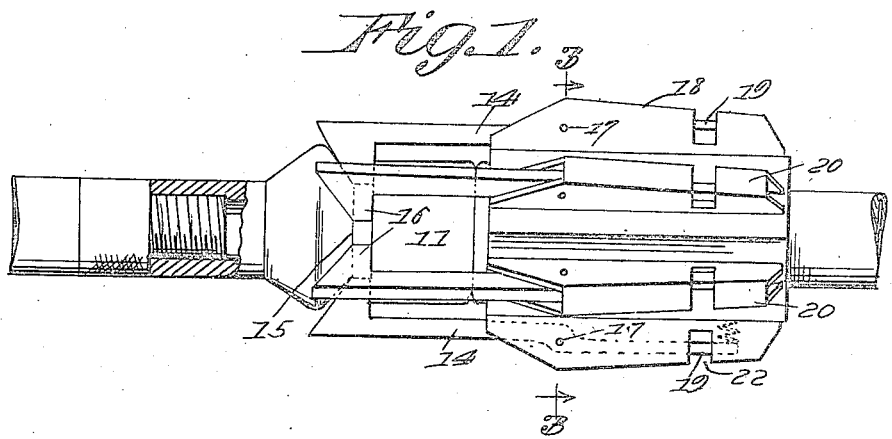
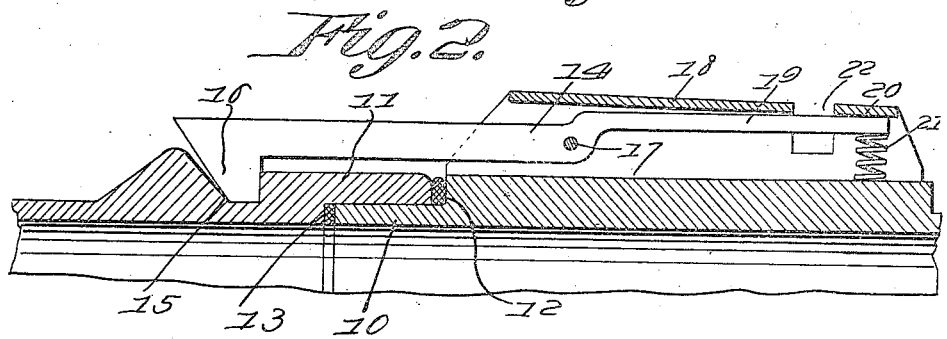
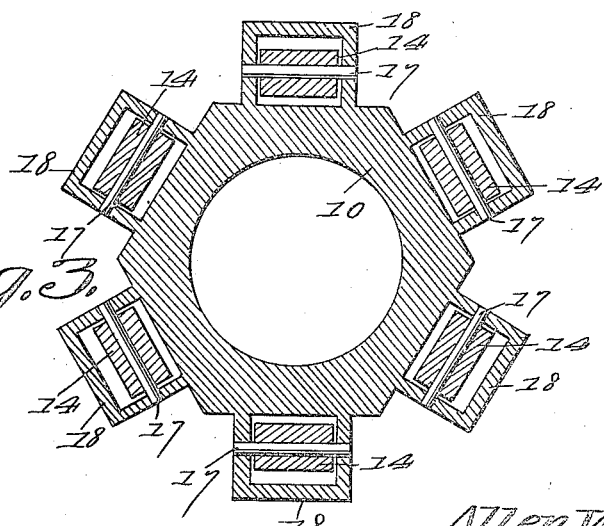

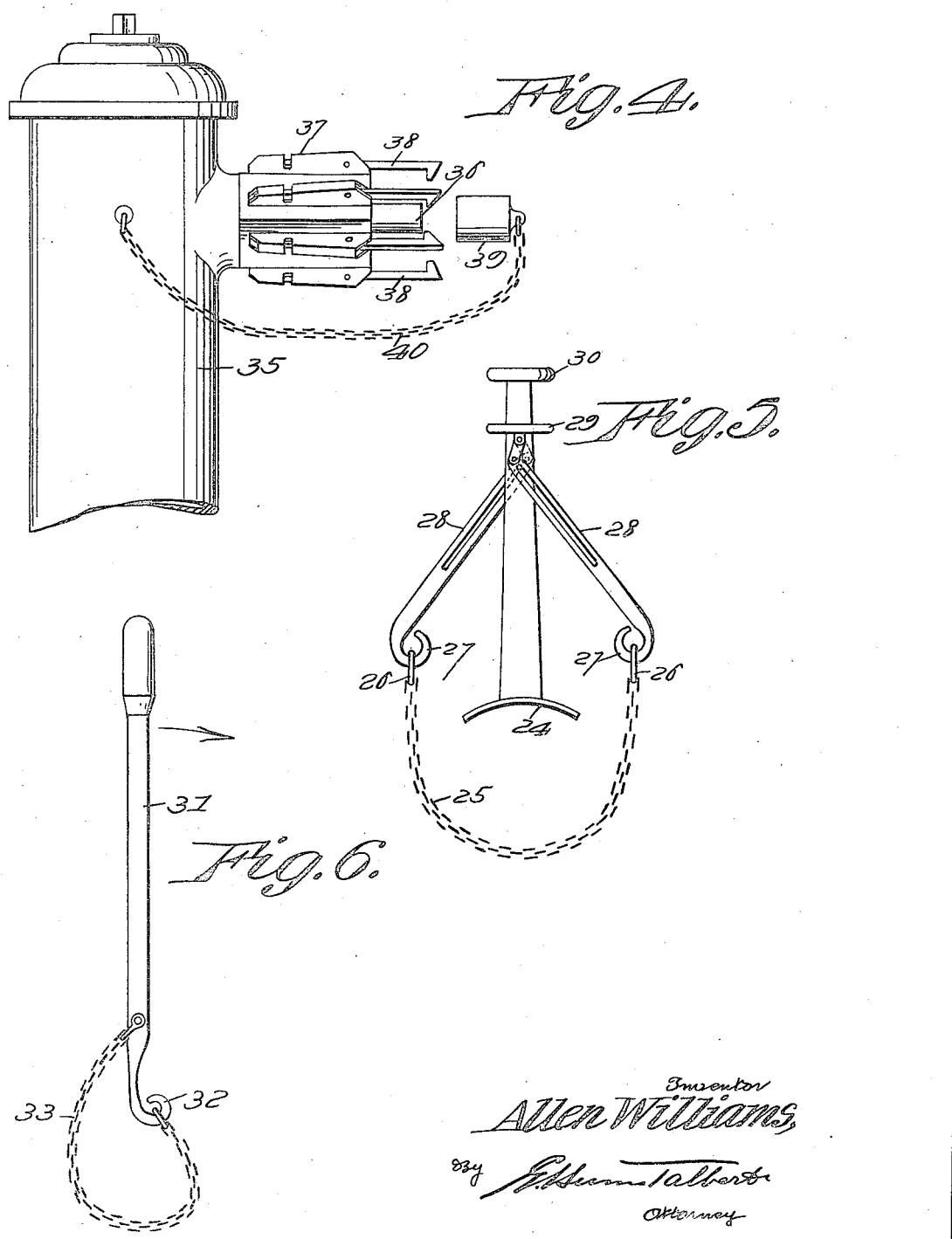

Patented Oct. 17, 1922.

1,432,583

UNITED STATES PATENT OFFICE.

ALLEN WILLIAMS, OF BRADY, TEXAS, ASSIGNOR OF ONE-HALF TO LEO P. CAMPBELL, OF BRADY, TEXAS.

HOSE COUPLING.

Application filed May 26, 1920. Serial No. 384,373.

*To all whom it may concern:*

Be it known that I, ALLEN WILLIAMS, a citizen of the United States of America, residing at Brady, in the county of McCulloch and State of Texas, have invented new and useful Improvements in Hose Couplings, of which the following is a specification.

The object of the invention is to provide a coupling adapted for joining the extremities of hose sections or for attaching a cap or closure to a nozzle or faucet under conditions providing for the use thereof without altering the forms of hose connections and wherein a water tight joint may be formed without the inconvenience and loss of time incident to an adjustment of a threaded connection and with these objects in view, the invention consists in the construction and combination of parts, of which a preferred embodiment is shown in the accompanying drawings, wherein:—

Figure 1, is a side view of a coupling embodying the invention.

Figure 2, is a detail longitudinal sectional view of the same.

Figure 3, is a transverse section on the plane indicated by the line 3—3 of Figure 1.

Figure 4, is a view of the coupling as applied to a hydrant closure or cap.

Figures 5 and 6 are detail views respectively of operating tools adapted for use in tightening and loosening the engaging and disengaging members of the coupling.

The device consists essentially of the male and female members 10 and 11 between the extremities of each of which and an abutting shoulder 12 of the male member is interposed a washer or gasket 13 of rubber or like compressible or yielding material, said members respectively carrying spring actuated latches 14 and sockets 15 for engagement by the noses 16 of the latches. In the construction illustrated, the latches of which any desired number may be employed are pivoted as at 17 within housings 18 which encircle the coupling member upon which the latches are mounted, the rearwardly extending tongues 19 of said latches being received respectively in the tail portions 20 of the housing and being engaged by springs 21 which serve to yieldingly maintain the latches in engaging relation with the annular socket 15 of the other member of the coupling. Said housing portions 20 are separated from the main portions by notches, as indicated at 22, the notches being arranged in a common transverse plane and being spanned by the enclosed tongues 19 so that while the said tongues are protected by the housings against contact with adjacent objects tending to displace the same and disengage the latches from the complemental member of the coupling, said tongues are accessible through the notches by an operating tool such as that indicated in Figure 5 to effect the simultaneous depression of the tongues and hence the disengagement of the ends of the latches from the other member of the coupling. Said operating tool consists of a shank 23 having a bearing member 24 and a complemental flexible element 25 adapted to be extended through the notches for engagement with the tongues, the reduced extremities of said flexible member being provided with rings 26 engaged by hooks 27 on slotted arms 28 connected with a carrier 29 disposed within easy reach of a grip 30 carried by the end of the shank, so that the operator may grasp the grip and cross head of the carrier to cause the relative clasping movement of the bearing elements 24 and 25 to contact with the tongues of the coupling latches to disengage the latter from the other member of the coupling.

In the modified construction of tool illustrated in Figure 6, the shank 31 is provided with a terminal hook 32 for engagement with the extremity of a flexible element 33 attached at the other end of an intermediate portion of the shank, and having disposed the flexible element in the notches through which the tongues of the latches are exposed, the swinging movement of the handle or shank in the direction indicated by the arrow in Figure 6 will cause a contraction of the flexible element necessary to effect the disengagement of the latches.

The attachability of the coupling to a hydrant or faucet cap or closure is shown in Figure 4 of the drawings, wherein 35 represents the hydrant stock having a nozzle 36 carrying housings 37 and latches 38 corresponding with those hereinbefore described for engagement with a cap or closure 39 adapted to be fitted over the end of the nozzle and flexibly connected with the hydrant stop by means of a retaining chain 40 or the equivalent thereof.

The invention having been described, what is claimed as new and useful is:—

A coupling having male and female members of which one is provided with a plurality of axially disposed housings spaced uniformly around its periphery, a plurality of latches provided with rearward extending tongues enclosed within said housings, pivot pins spanning the side walls of the housings and pivotally mounting said latches whose ends remote from the tongues are provided with noses for terminal engagement with sockets formed on the other members, and compression springs in the housings and actuated on the housings to force the latch noses into socket engaging position, the housings being provided in a common transverse plane with notches exposing spanning portions of the latch tongues whereby a wrench may be applied to all of said tongues simultaneously to release all of the latches.

In testimony whereof he affixes his signature.

ALLEN WILLIAMS.